US012783128B2

(12) United States Patent
Miller et al.

(10) Patent No.: US 12,783,128 B2
(45) Date of Patent: Nov. 3, 2026

(54) MODULATING PEAK OPERATING TEMPERATURE IN A MEMORY SUB-SYSTEM

(71) Applicant: MICRON TECHNOLOGY, INC., Boise, ID (US)

(72) Inventors: Michael G. Miller, Boise, ID (US); Jing Sang Liu, Shanghai (CN); Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 2 days.

(21) Appl. No.: 19/179,607

(22) Filed: Apr. 15, 2025

(65) Prior Publication Data

US 2025/0355565 A1 Nov. 20, 2025

Related U.S. Application Data

(60) Provisional application No. 63/648,339, filed on May 16, 2024.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
USPC .................................................. 711/154, 103
See application file for complete search history.

(56) References Cited

U.S. PATENT DOCUMENTS 11,462,256 B2 * 10/2022 Asami ............... G11C 11/40626
2014/0254285 A1 * 9/2014 Eguchi .................. G11C 16/14 365/185.29
2017/0032836 A1 * 2/2017 Kimura ................. G11C 16/10

* cited by examiner

*Primary Examiner* — Hashem Farrokh
(74) *Attorney, Agent, or Firm* — Lowenstein Sandler LLP

(57) ABSTRACT

A processing device in a memory sub-system receives a request to write data to the memory device, wherein the memory device is configured to store a first number of bits per memory cell. The processing device obtains a temperature measurement of the memory device. Responsive to determining that the temperature measurement of the memory device satisfies a first operating temperature threshold criterion, the processing device reconfigures the memory device to store a second number of bits per memory cell, wherein the first operating temperature threshold criterion is associated with the first number of bits per memory cell, and wherein the second number of bits per memory cell is less than the first number of bits per memory cell. The processing device performs a write operation to store the data in the memory device using the second number of bits per memory cell.

20 Claims, 7 Drawing Sheets

MODULATING PEAK OPERATING TEMPERATURE IN A MEMORY SUB-SYSTEM

RELATED APPLICATIONS

This application claims the benefit of U.S. Provisional Patent Application No. 63/648,339 filed May 16, 2024, entitled "Modulating Peak Operating Temperature in a Memory Sub-system" which is incorporated by reference herein.

TECHNICAL FIELD

Embodiments of the disclosure relate generally to memory sub-systems, and more specifically, relate to modulating peak operating temperature in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
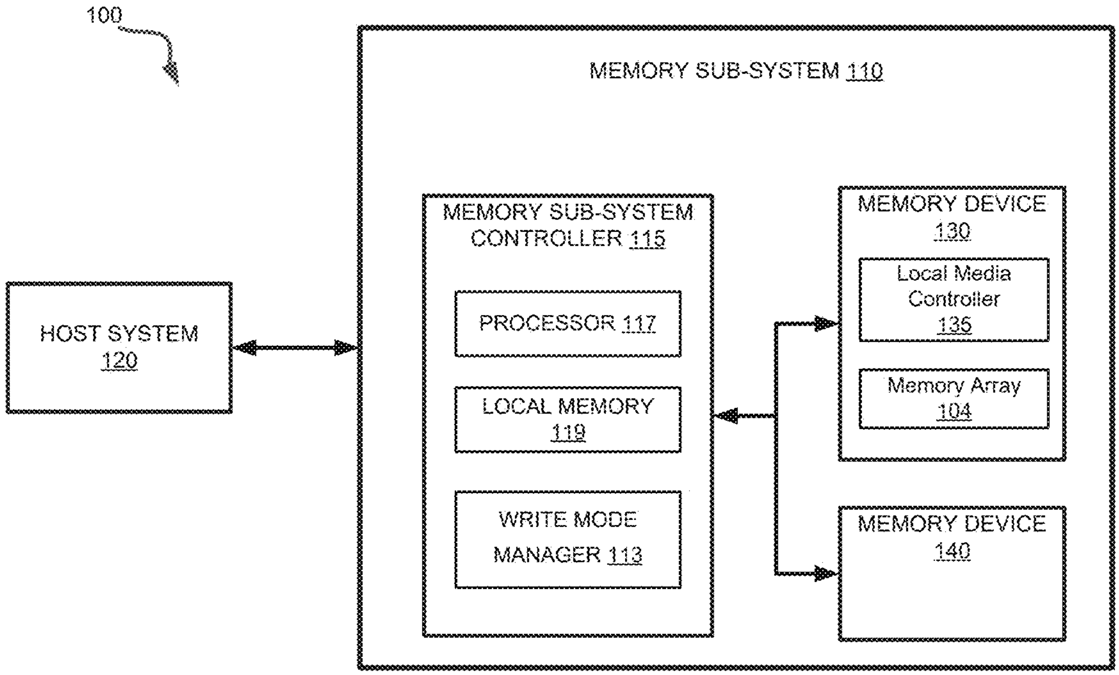
FIG. 1 illustrates an example computing system that includes a memory sub-system in accordance with some embodiments of the present disclosure.

Aspects of the present disclosure are directed to modulating peak operating temperature in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device (e.g., a memory die) can include multiple memory cells arranged in a two-dimensional or three-dimensional grid. Memory cells are formed onto a silicon wafer in an array of columns (e.g., interconnected by conductive lines that are hereinafter referred to as bitlines) and rows (e.g., interconnected by conductive lines that are hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

As computing devices become more compact and their performance requirements increase, thermal management becomes increasingly relevant. A challenge arises from the varying temperature tolerances of different components within these systems. Specifically, the memory device (e.g., NAND flash memory) may have a lower maximum operating temperature compared to other components like Application-Specific Integrated Circuits (ASICs) and Dynamic Random-Access Memory (DRAM) devices. For example, a NAND memory device may be rated for operation up to 85 degrees Celsius (° C.), whereas the ASICs and DRAM may be capable of enduring higher temperatures, in the range of 115-125° C. and 105° C., respectively. This becomes an issue in small form factor devices or when using Ball Grid Array (BGA) solutions, where the close physical proximity of the ASIC to the memory device results in less available space for heat dissipation. The ASIC may be indirectly constrained by the memory device's thermal limits as there is little space between the components for the generated heat to dissipate. In addition, the heat generated by the ASIC during intensive processing tasks can quickly elevate the temperature of the memory device to its maximum limit.

This thermal limitation of the memory device imposes a bottleneck on the overall system performance. During periods of high computational demand, such as when performing a high volume of sequential memory access operations (hereafter referred to as a "burst"), memory sub-systems may be forced to throttle down their performance to prevent the memory device from overheating. This throttling, while necessary to protect the integrity and reliability of the memory device, means reducing data processing speeds, impacting the device's ability to perform tasks efficiently. This is especially an issue for applications requiring sustained high performance. A system's inability to use its full performance due to the memory device's comparatively low temperature tolerance may lead to a significant decrease in performance. At a temperature beyond the defined operational limit (e.g., greater than 85° C.) the memory sub-system may be forced to halt all operations but for small value read operations to avoid command timeout, to preserve the data in the memory device. Addressing this thermal bottleneck by increasing the memory device's maximum operating temperature could therefore provide a substantial competitive advantage, allowing for higher burst performance without compromising the system's reliability or the longevity of its components.

Raising the maximum operating temperature of the memory device, however, may negatively affect the reliability of the memory device. Reading and writing data at high temperatures may result in errors due to the nature of the memory cells in the memory device. A memory device can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store two, three, and four bits per cell, respectively. Each cell stores data by maintaining a specific charge level within the cell, which corresponds to a voltage level. These voltage levels represent the binary data stored in the cells, with SLC having two levels (for 0 and 1), MLC four levels (for 00, 01, 10, 11), TLC eight levels (for 000 to 111), and QLC sixteen levels (for 0000 to 1111).

The accuracy with which data can be read from or written to a cell depends on the clarity of the voltage levels. Ideally, each voltage level would be distinct and easily distinguishable from the others, with some margin in between. Due to various factors, however, including manufacturing variances, wear, and temperature fluctuations, the charge stored in a cell—and thus its voltage level—can vary. This variance results in a distribution of threshold voltages (e.g., a "threshold voltage distribution") for each voltage level. The space between these threshold voltage distributions (hereafter referred to as "valleys") are used to differentiate between the threshold voltage distributions representing each possible data value.

During a read operation, processing logic in the memory sub-system may determine the data stored in a memory cell by identifying which threshold voltage distribution (e.g., the range of voltages that have been predetermined by the memory controller to represent a data state) that the cell's measured threshold voltage (e.g., the actual voltage read during the operation) falls within. This operation can be executed by applying a read voltage, then comparing the cell's measured threshold voltage against this applied read voltage to determine its threshold voltage distribution. As the number of bits per memory cell increases (e.g., from SLC to QLC), the number of data values that a single cell can represent increases, necessitating more threshold voltage distributions and corresponding voltage levels. As a result, the valleys become narrower, increasing the precision required to distinguish between these distributions. Narrower valleys mean that even small shifts in a cell's threshold voltage, such as those caused by temperature changes, wear, or manufacturing inconsistencies, can lead to errors in data interpretation. These shifts can cause the threshold voltage of a cell to move closer to, or even cross into, the adjacent threshold voltage distribution, making it difficult for the processing logic to determine the correct state of the cell. High temperatures, in particular, may shift the threshold voltage distributions and can lead to overlap between the distributions, making it more challenging to accurately read the stored data. In addition, the voltage levels that once distinguished different data states may no longer be as distinct or may intersect with adjacent threshold voltage distributions. For example, cells written to when the memory device is at a higher temperature may experience a threshold voltage shift as the memory device cools to a lower temperature. This shift can lead to misinterpretation of the stored data, resulting in read errors.

Aspects of the present disclosure address the above and other deficiencies by reconfiguring a memory device in a memory sub-system to store a lesser number of bits per memory cell depending on the temperature of the memory device. In one embodiment, a processing device in the memory sub-system receives a request to write data to the memory device. The memory device may be configured to store multiple bits per memory cell (e.g., three bits per cell for TLC memory or four bits per cell for QLC memory). The processing device monitors the temperature of the memory device and, upon determining that the temperature has exceeded what has been defined to be the highest temperature at which the memory device can reliably operate (hereafter defined as a "critical temperature" (CT)), reconfigures the memory device to store a lesser number of bits per cell (e.g., two bits per cell for MLC memory or one bit per cell for SLC memory). With the memory device reconfigured to store a lesser number of bits per cell, the processing device can perform a write operation to write the data to the memory device.

By reconfiguring the memory device to store a lesser number of bits per cell, the memory device can reliably operate beyond the maximum operating temperature associated with the larger number of bits per cell. High temperatures may cause threshold voltage distributions to shift which can lead to overlap with other threshold voltage distributions. By storing fewer bits per cell, the valleys between these threshold voltage distributions are broadened. This increased margin provides a greater buffer against temperature-induced shifts in a cell's threshold voltage, thereby reducing the likelihood of data interpretation errors due to distribution overlap under high temperature conditions, which improves data reliability in the memory sub-system.

Furthermore, by increasing the maximum operating temperature of the memory device, or at least bringing it closer to that of other components in the processing device, the processing device can maintain higher levels of performance without needing to throttle back to protect the memory device, even for brief bursts. This is particularly beneficial as form factors become smaller and the options for managing heat are reduced. Addressing this thermal bottleneck by increasing the memory device's maximum operating temperature could therefore provide a substantial advantage, allowing for higher burst performance without compromising the system's reliability or the longevity of its components.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a Write Mode Manager component 113 that can reconfigure the memory device to store a lesser number of bits per memory cell depending on the temperature of the memory device 130. In some embodiments, the memory sub-system controller 115 includes at least a portion of the Write Mode Manager component 113. In some embodiments, the Write Mode Manager component 113 is part of the host system 120, an application, or an operating system. In other embodiments, local media controller 135 includes at least a portion of Write Mode Manager component 113 and is configured to perform the functionality described herein.

The Write Mode Manager component 113 can reconfigure the memory device 130 to store a lesser number of bits per memory cell depending on the temperature measurement of the memory device. In an embodiment, memory sub-system controller 115 receives a request to write data on the memory device 130. The memory device 130 may be configured to store a first number of bits per memory cell (e.g., four bits per cell for QLC memory or three bits per cell for TLC memory). In one embodiment, write mode manager 113 monitors the temperature of the memory device 130 and, upon determining that the temperature satisfies a first temperature threshold criterion, reconfigures at least a portion of the memory device 130 to store a second, lesser number of bits per cell (e.g., two bits per cell for MLC memory or one bit per cell for SLC memory). The operations the Write Mode Manager Component 113 performs can vary depending on the temperature threshold criterion. Further details with regards to the operations of the Write Mode Manager component 113 are described below.

Figure 2A:
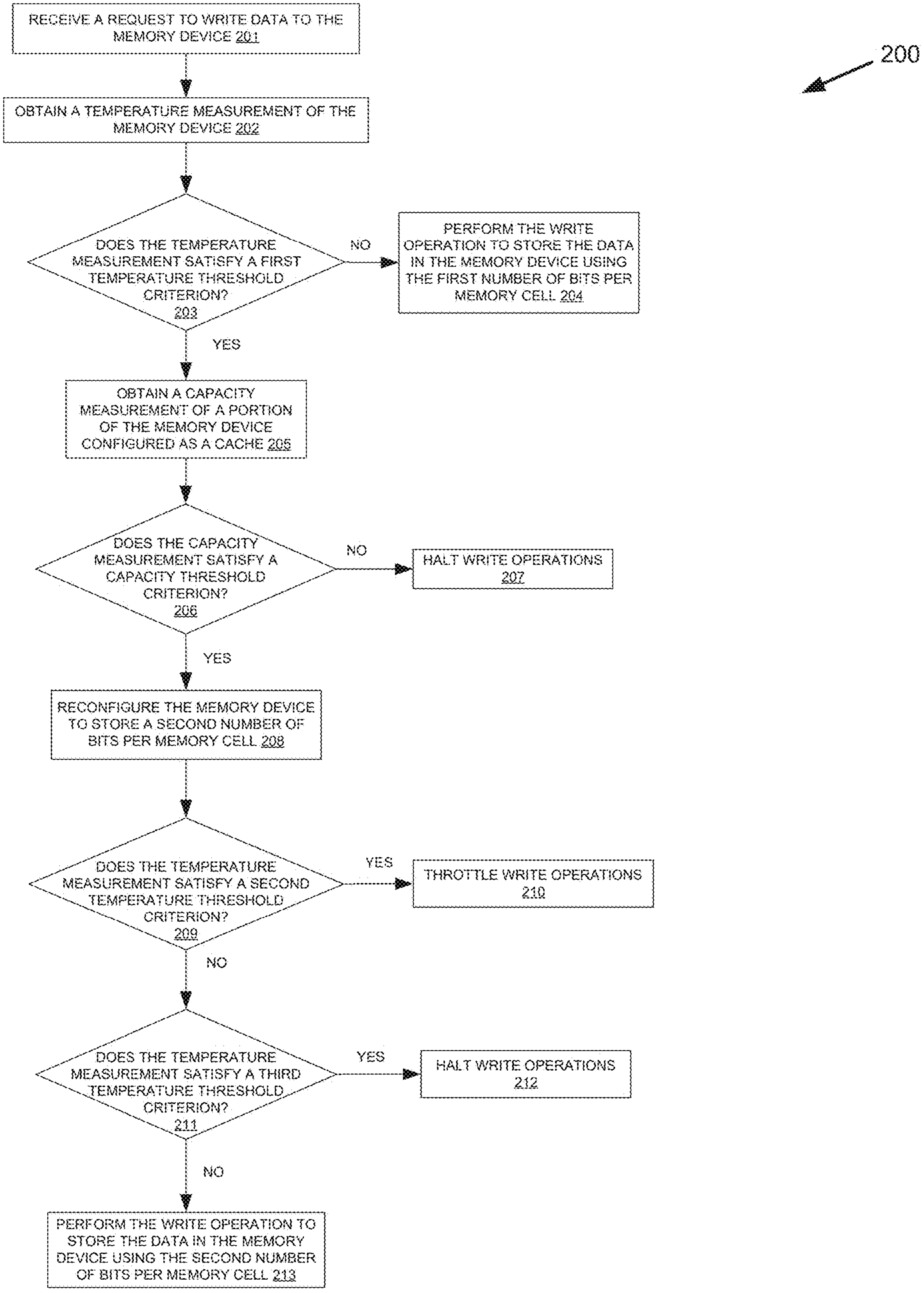
FIG. 2A and FIG. 2B are flow diagrams of an example method of modulating peak operating temperature in a memory sub-system in accordance with some embodiments of the present disclosure.
Figure 2B:
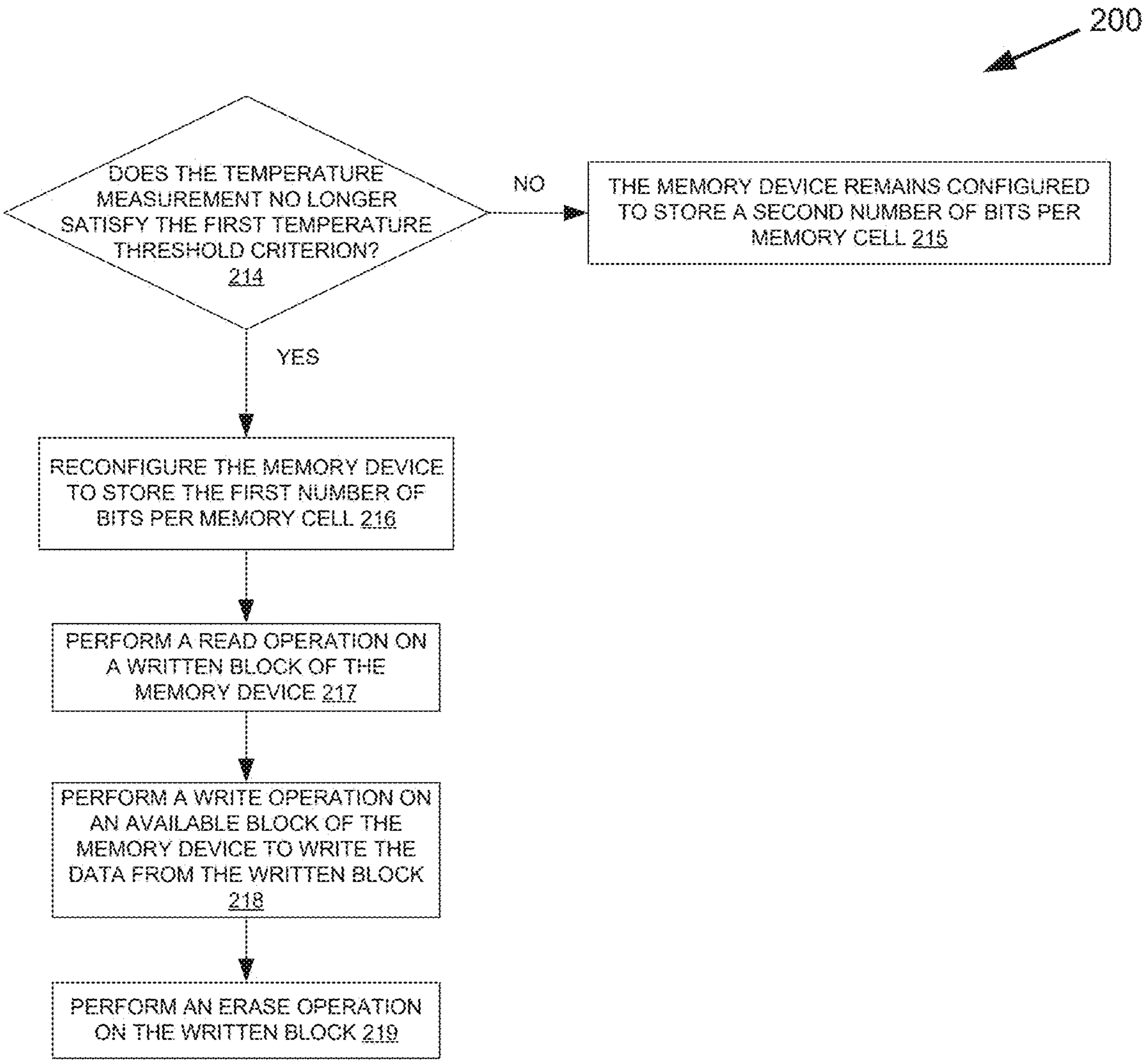

FIG. 2A and FIG. 2B are flow diagrams constituting an example method 200 of modulating peak operating temperature in a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the Write Mode Manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 2A, at operation 201, the processing logic (e.g., Write Mode Manager component 113) receives a request to write data to a memory device, such as memory device 130, wherein the memory device is configured to store a first number of bits per memory cell. In some embodiments, the first number of bits per memory cell is defined as multiple bits within a single memory cell. This includes configurations such as NAND MLC, TLC, and QLC.

At operation 202, the processing logic obtains a temperature measurement of the memory device. In some embodiments, the memory sub-system 110 includes a temperature sensor, which can be polled periodically or on demand by the processing logic. In some embodiments, the processing logic monitors the temperature status of the memory device in one second intervals. In some embodiments, the processing logic polls the temperature sensor in response to a trigger (e.g., a specific event such as an anomaly or an operation). Alternative methods or systems for temperature monitoring can be used in other embodiments, varying in duration, interval, and/or trigger, among other variables.

Figure 3:
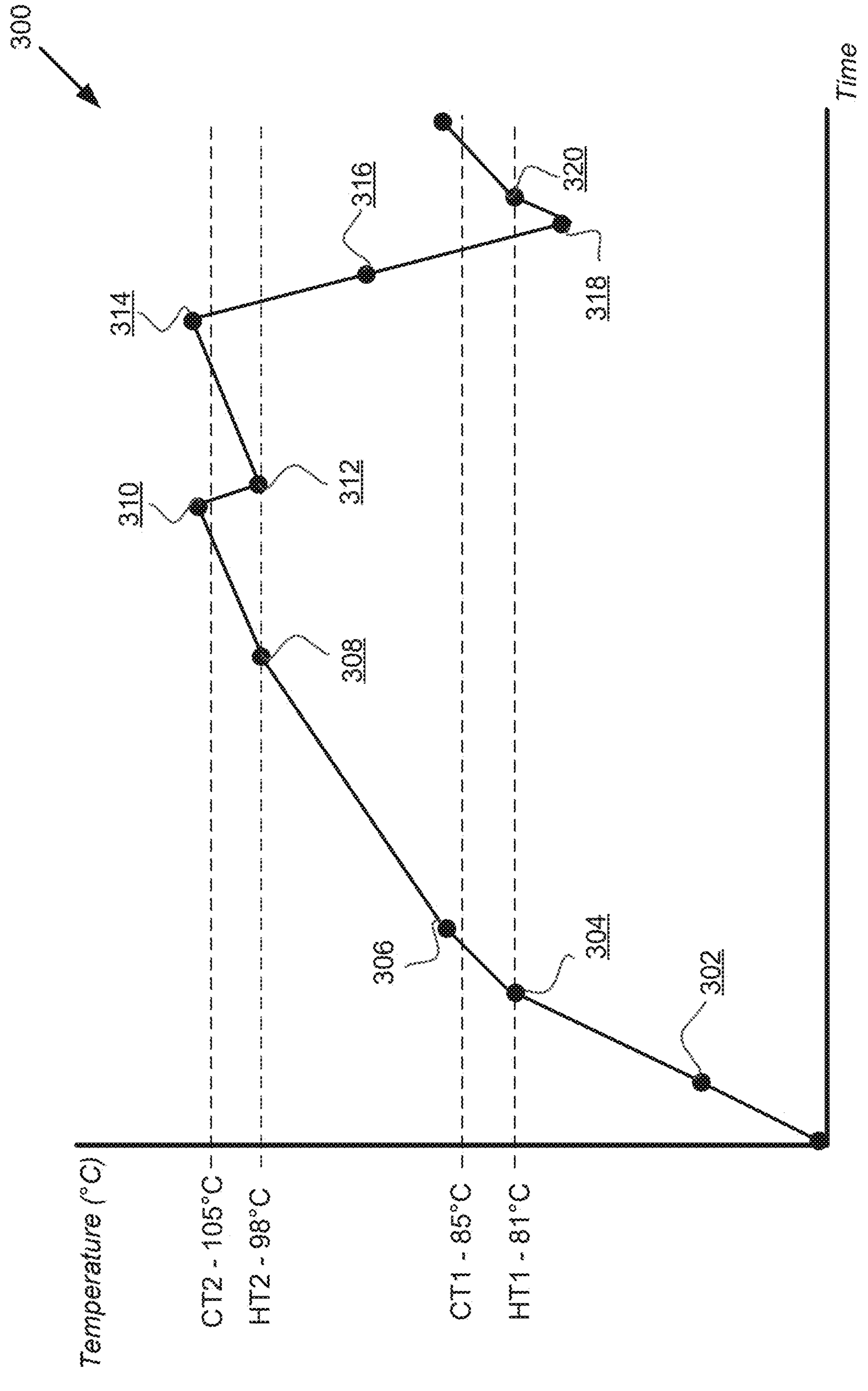
FIG. 3 is a chart plotting the temperature of the memory device over time to illustrate how the temperature can be affected by operations in example method 200 of FIG. 2A and FIG. 2B and vice versa in accordance with some embodiments of the present disclosure.

At operation 203, the processing logic determines whether the temperature measurement of the memory device satisfies a first operating temperature threshold criterion, wherein the first operating temperature threshold criterion is associated with the first number of bits per memory cell. In one embodiment, the first operating temperature threshold criterion is satisfied if the temperature measurement is greater than a defined threshold temperature. In some embodiments, the threshold temperature is defined as the highest temperature at which the memory device can reliably operate while configured to store the first number of bits per memory cell (hereafter referred to as "critical temperature 1" (CT1)). For example, in an embodiment where a NAND memory device is rated for use up to 85° C. using TLC, this temperature of 85° C. is defined as CT1. If the temperature measurement were to exceed CT1, the temperature measurement would satisfy the first operating temperature threshold criterion. FIG. 3 is a chart plotting the temperature 300 of the memory device over time to illustrate how the temperature can be affected by operations in example method 200 of FIG. 2A and FIG. 2B and vice versa. In FIG. 3, the first operating temperature threshold criterion is marked CT1. As long as the temperature measurement is less than or equal to the defined threshold temperature, the first operating temperature threshold criterion is not satisfied.

Responsive to determining that the temperature measurement fails to satisfy the first operating temperature threshold criterion, at operation 204, the processing logic performs the write operation to store the data in the memory device 130 using the first number of bits per memory cell. A temperature measurement at or below CT1 fails to satisfy the first threshold criterion. In FIGS. 3, 302, 304, 318, and 320 represent points at which the temperature measurement fails to satisfy the first operating temperature threshold criterion. Thus, 302, 304, 318, and 320 are temperatures at which the memory device can operate reliably using the first number of bits per memory cell.

Responsive to determining the temperature measurement satisfies the first operating temperature threshold criterion, at operation 208, the processing logic reconfigures at least a portion of the memory device 130 to store a second number of bits per memory cell, wherein the second number of bits per memory cell is less than the first number of bits per memory cell. In some embodiments, if the temperature measurement were to exceed CT1, the temperature measurement would satisfy the first operating temperature threshold criterion. In some embodiments, the second number of bits per memory cell constitutes storing a single bit per memory cell (e.g., in NAND, SLC). For example, a memory device using NAND architecture that is configured to write using the first number of bits per cell, such as when using TLC, is reconfigured by the processing logic to write using a lesser, second number of bits per memory cell, such as when using SLC.

In some embodiments, the second number of bits per memory cell constitutes multiple bits per memory cell, with the second number of bits less than the first number of bits. An example of this embodiment using NAND technology is where the first number of bits per memory cell reflects a TLC configuration and the second number of bits per memory cell reflects an MLC configuration. In FIG. 3, 306 represents a point at which the temperature measurement satisfies the first operating temperature threshold criterion, and the processing logic reconfigures the memory device to use the second number of bits per memory cell. For example, the processing logic can utilize a portion of memory device 130 as a cache (hereinafter referred to as "the cache"), where memory cells in the cache are configured to store the second number of bits per memory cell (e.g., lower density blocks such as SLC).

At operation 205, the processing logic obtains a capacity measurement of the cache. In some embodiments, this cache serves as a buffer when writing to the memory device 130. For example, the processing logic can initially write data to the SLC cache, and that data can later be migrated to other portions of the memory device 130, which may be configured as TLC or QLC memory.

In some embodiments, the processing logic monitors the capacity of the cache, obtaining capacity measurements in periodic intervals (e.g., every one second). In some embodiments, taking a capacity measurement of the cache may be triggered by the memory device being reconfigured to store the second number of bits per memory cell as in operation 208.

At operation 206, the processing logic determines whether the capacity measurement of the cache of the memory device satisfies a capacity threshold criterion. In one embodiment, the capacity threshold criterion is satisfied if the capacity measurement is greater than or equal to a defined threshold amount. In some embodiments, the defined threshold amount is a minimum amount (e.g., a percentage) of the cache that is available to be written to. If the capacity measurement indicates that the amount of the cache that is available to be written to is less than the defined threshold amount, the processing logic determines that the capacity measurement of the cache of the memory device fails to satisfy the capacity threshold criterion. If the capacity measurement indicates that the amount of the cache that is available to be written to is equal to or greater than the defined threshold amount, the processing logic determines that the capacity measurement of the cache of the memory device satisfies the capacity threshold criterion. In FIG. 3, 306 represents a point at which the processing logic makes this determination.

Responsive to determining that the capacity measurement of the cache of the memory device fails to satisfy the capacity threshold criterion, at operation 207, the processing logic halts write operations to the memory device.

Responsive to determining that the capacity measurement of the cache of the memory device satisfies the capacity threshold criterion, wherein the capacity measurement indicates that the amount of available space in the cache is equal to or exceeds the defined threshold amount, at operation 208, the processing logic reconfigures the memory device to store the second number of bits per memory cell, wherein the second number of bits per memory cell is less than the first number of bits per memory cell. In some embodiments, the memory device, excluding the cache, is reconfigured to use the second number of bits per cell.

In some embodiments, reconfiguring the memory device to store a second number of bits per memory cell requires that the temperature measurement satisfy a first operating temperature threshold criterion, as in operation 203, in addition to the capacity measurement of the cache satisfying the capacity threshold criterion. In FIG. 3, determining that both criteria are met can occur at point 306.

At operation 209, the processing logic determines whether the temperature measurement of the memory device satisfies a second operating temperature threshold criterion, wherein the second operating temperature threshold criterion is associated with the second number of bits per memory cell. In some embodiments, the second operating temperature threshold criterion is satisfied if the temperature measurement is greater than a second threshold temperature. In some embodiments, the second threshold temperature is the temperature at which the write performance of a memory device begins to be throttled (e.g., reducing the frequency with which write operations are executed by the processing logic) while configured to store the second number of bits per memory cell. This temperature is hereafter referred to as the "high temperature" (HT). An HT is a lower temperature than a CT; as the temperature of the memory device approaches the CT (at which the processing logic halts write operations), the processing logic can throttle the write performance of the memory device to slow the rate at which the temperature is increasing over time, prolonging the amount of time in which the memory device can operate before exceeding the CT. In some embodiments, an HT is selected based on its proximity to a CT. The proximity of an HT to a corresponding CT can vary across embodiments. In FIG. 3, the second operating temperature threshold criterion is denoted "High Temperature 2" (HT2) and is represented by points 308 and 312.

In some embodiments, there is an HT for when the memory device is configured to store the first number of memory cells referred to as "High Temperature 2" (HT2). Just as at operations 308 and 312 for the second operating temperature threshold criterion, at HT2, the processing logic throttles write operations for the memory device, reducing the load on the memory device and decreasing the rate at which the temperature of the memory device is increasing. The degree to which the processing logic throttles write operations can vary across embodiments. The point at which throttling occurs when using the first number of bits per memory cell is represented in FIG. 3 at points 304 and 320.

Responsive to determining that the temperature measurement satisfies the second operating temperature threshold criterion, at operation 210, the processing logic throttles write operations for the memory device to reduce a frequency of the write operations. In some embodiments, the processing logic throttles write operations by adding fixed delays when sending write commands to the memory device. In some embodiments, the processing logic throttles write operations by slowing down the clock of the ASIC. In some embodiments, the processing logic throttles write operations by slowing down the clock of the memory sub-system controller 115. In some embodiments, the processing logic throttles write operations by reducing the frequency of read commands sent to the memory device. The disclosure is not limited to these methods of throttling.

Responsive to determining that the temperature measurement fails to satisfy the second operating temperature threshold criterion, at operation 213, the processing logic performs a write operation to store the data in the memory device using the second number of bits per memory cell.

At operation 211, the processing logic determines whether the temperature measurement of the memory device satisfies a third operating temperature threshold criterion, wherein the third operating temperature threshold criterion is associated with the second number of bits per memory cell. In some embodiments, the third operating temperature threshold criterion is satisfied if the temperature measurement is greater than a third threshold temperature. In some embodiments, the third threshold temperature is defined as the highest temperature at which the memory device can reliably operate while configured to store the second number of bits per memory cell; the third operating temperature threshold criterion is the CT for a memory device using the second number of bits per memory cell. In FIG. 3, the third operating temperature threshold criterion is marked CT2 ("Critical Temperature 2"). If the temperature measurement were to exceed CT2, the temperature measurement would satisfy the third operating temperature threshold criterion.

Responsive to determining that the temperature measurement fails to satisfy the third operating temperature threshold criterion, at operation 213, the processing logic performs the write operation to store the data in the memory device using the second number of bits per memory cell. A temperature measurement at or below CT2 fails to satisfy the first threshold criterion. In FIGS. 3, 308 and 312 are example points at which the temperature measurement fails to satisfy the third operating temperature threshold criterion; 308 and 312 are associated with a temperature at which the memory device can operate reliably using the second number of bits per memory cell.

Responsive to determining that the temperature measurement of the memory device satisfies the third operating temperature threshold criterion, at operation 212, the processing logic halts write operations to preserve the reliability of the write operations and decrease the load on the memory device, allowing for its temperature to decrease to an operational level. A temperature measurement exceeding CT2 satisfies the third threshold criterion. In FIGS. 3, 310 and 314 represent points at which the temperature measurement exceeds CT2, satisfying the third operating temperature threshold criterion.

The duration for which the processing logic halts write operations may vary depending on the embodiment. For example, in some embodiments, at operation 212, the processing logic halts write operations until the temperature of the memory device decreases below CT2. In other embodiments, the processing logic halts write operations until the temperature of the memory device decreases below CT1.

Responsive to determining that the temperature measurement fails to satisfy a third operating temperature threshold criterion, at operation 213, the processing logic performs a write operation to store the data in the memory device using the second number of bits per memory cell.

Referring now to FIG. 2B, at operation 214, the processing logic determines whether the temperature measurement satisfies the first operating temperature threshold criterion, wherein the memory device is configured to store the second number of bits per memory cell. Just as at operation 203, in some embodiments, the first operating temperature threshold criterion is based on the highest temperature at which the memory device can reliably operate while configured to store the first number of bits per memory cell (CT1). If the temperature measurement were to exceed CT1, the temperature measurement would satisfy the first operating temperature threshold criterion.

Responsive to determining that the temperature measurement satisfies the first operating temperature threshold criterion, at operation 215, the memory device remains configured to store the second number of bits per memory cell. For example, at point 316 of FIG. 3, the processing logic determines that the temperature exceeds CT1, satisfying the first operating temperature threshold criterion. In an embodiment, to maintain data integrity, the device remains configured with the more reliable second number of bits per memory cell until the temperature drops to a level at or below CT1.

Responsive to determining that the temperature measurement no longer satisfies the first operating temperature threshold criterion, at operation 216, the processing logic reconfigures the memory device to store the first number of bits per memory cell. In FIG. 3, 318 represents a point where, while the memory device is using the second number of bits per memory cell, the temperature measurement fails to satisfy the first operating temperature threshold criterion. Here, the processing logic can reliably use the first number of bits per memory cell when writing data to the memory device.

In some embodiments, upon reconfiguring the memory device to store the first number of bits per memory cell, the processing logic performs garbage collection (GC) operations on data that had been written to the memory device using the second number of bits per cell. Data written to the memory device using the first number of bits per cell is more information-dense than that written using the second number of bits per cell; storing data using the first number of bits per cell allows for greater data storage capacity within the same physical space. Folding is a media management operation used in GC that can be used to take advantage of the higher density of using the first number of bits per cell; folding can be used to rewrite the data written using the second number of bits per cell using the first number of bits per cell, freeing up space for new writes.

As part of a folding operation, at operation 217, the processing logic performs a read operation on a written block of the memory device, the written block comprising data stored using the second number of bits per memory cell. At operation 218, the processing logic performs a write operation on an available block of the memory device to write the data from the written block, wherein the available block is configured to store the first number of bits per memory cell. At operation 219, the processing logic performs an erase operation on the written block.

Figure 4A:
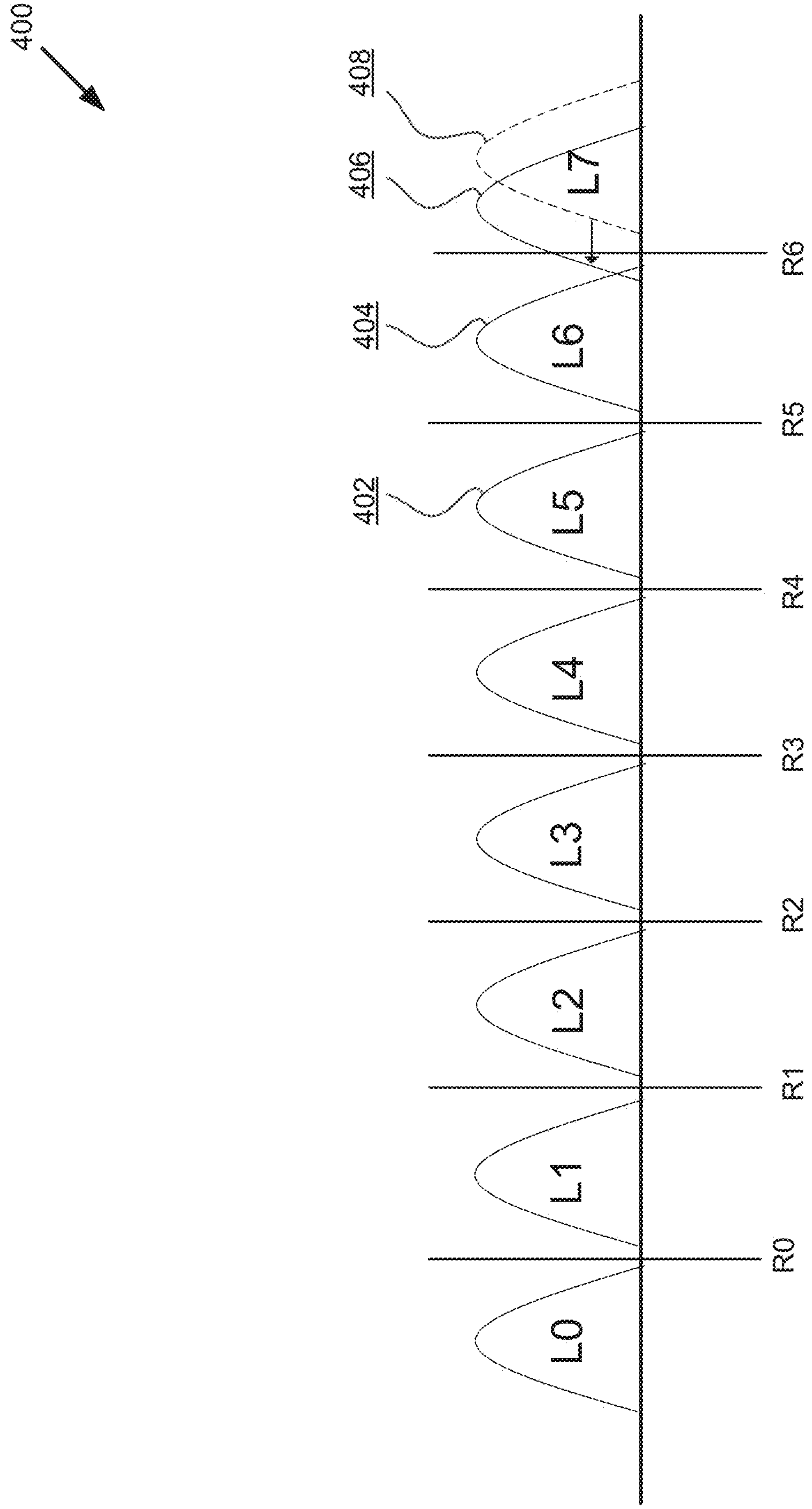
FIG. 4A illustrates the threshold voltage distribution for a memory device configured to store the first number of bits per memory cell in accordance with some embodiments of the present disclosure.
Figure 4B:
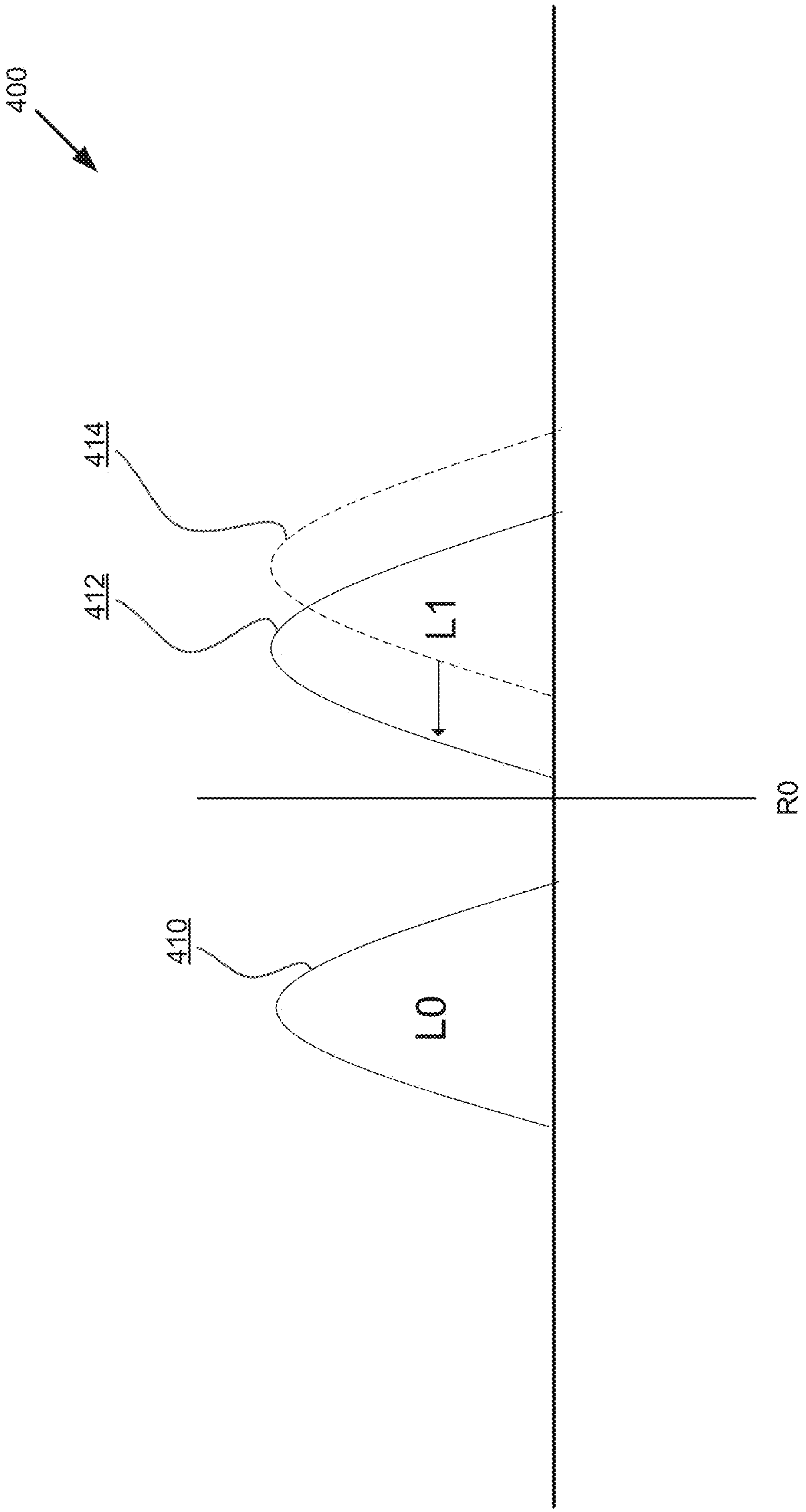
FIG. 4B illustrates the threshold voltage distribution for a memory device configured to store the second number of bits per memory cell in accordance with some embodiments of the present disclosure.

FIG. 4A and FIG. 4B illustrate the threshold voltage distributions for a memory device configured to store the first number of bits per memory cell and the second number of bits per memory cell, respectively.

FIG. 4A illustrates the threshold voltage distributions for a memory device configured to store the first number of bits per memory cell. In FIG. 4A, the memory device is configured to store data using NAND TLC; the first number of bits per memory cell is three. NAND TLC has eight voltage levels (e.g., L0, L1, L2, L3, L4, L5, L6, and L7), with each voltage level corresponding to a threshold voltage distribution for the memory cells. R0, R1, R2, R3, R4, R5, and R6 are the read voltages applied by the processing logic when determining which threshold voltage distribution a memory cell falls within (e.g., for reading data). 402, 404, 406, and 408 are threshold voltage distributions.

Using TLC necessitates more threshold voltage distributions and corresponding voltage levels than when using SLC to store data; the number of data values that a single cell represents is greater in comparison to an implementation using SLC. increases. As a result, the valleys are narrower, increasing the precision required to distinguish between these distributions. Narrower valleys mean that even small shifts in a cell's threshold voltage, such as those caused by temperature.

High temperatures (e.g., above the CT for that number of bits per memory cell), in particular, may shift the threshold voltage distributions and can cause the threshold voltage of a cell to move closer to, or even cross into, the adjacent threshold voltage distribution, making it more challenging for the processing logic to accurately read the stored data; the voltage levels that once distinguished different data states may no longer be as distinct or may intersect with adjacent threshold voltage distributions. 408 and 406 illustrate this shift, with L7 moving from its position at 408 to 406 and intersecting with L6. As a consequence, when applying a read voltage R6, the processing logic may incorrectly determine a memory cell of L7 to be a part of L6, leading to errors in data interpretation and read errors.

402, 404, and 408 represent the threshold voltage distributions of a memory device operating in ideal conditions, with ample "valley" between each threshold voltage distribution and each voltage level distinct and easily distinguishable. When performing at operating temperatures (e.g., below the CT for that number of bits per memory cell), the threshold voltage distributions are more likely to have ample margins between them, with less threat of errors in data interpretation related to temperature.

FIG. 4B illustrates the threshold voltage distributions for a memory device configured to store the second number of bits per memory cell. In FIG. 4B, the memory device is configured to store data using NAND SLC; the second number of bits per memory cell is one. NAND SLC has two voltage levels (e.g., L0 and L1), with each voltage level corresponding to a threshold voltage distribution for the memory cells. R0 is the read voltage applied by the processing logic when determining which threshold voltage distribution a memory cell falls within. 410, 412, and 414 are threshold voltage distributions. 410 and 414 represent the threshold voltage distributions of a memory device operating in "ideal" conditions (e.g., write operations occurred while the memory device was operating at a temperature below CT).

In some embodiments, for the memory device to be configured to store the second number of bits per memory cell the temperature measurement is determined to satisfy the first temperature threshold criterion (e.g., operation 203) and has been reconfigured from the first number of bits per memory cell. High temperatures may cause threshold voltage distributions to shift which can lead to overlap with other threshold voltage distributions. 412 and 414 illustrate this shift, with L1 moving from its position at 414 to 412. However, unlike with L7 in FIG. 4A, L0 and L1 remain distinct, with ample "valley" between the threshold voltage distributions. By storing fewer bits per cell, the valleys between these threshold voltage distributions are broadened. This increased margin provides a greater buffer against temperature-induced shifts in a cell's threshold voltage, thereby reducing the likelihood of data interpretation errors due to distribution overlap under high temperature conditions. By reconfiguring to store the second number of bits per cell, the memory device can reliably operate beyond the CT associated with the first number of bits per cell (CT1).

Figure 5:
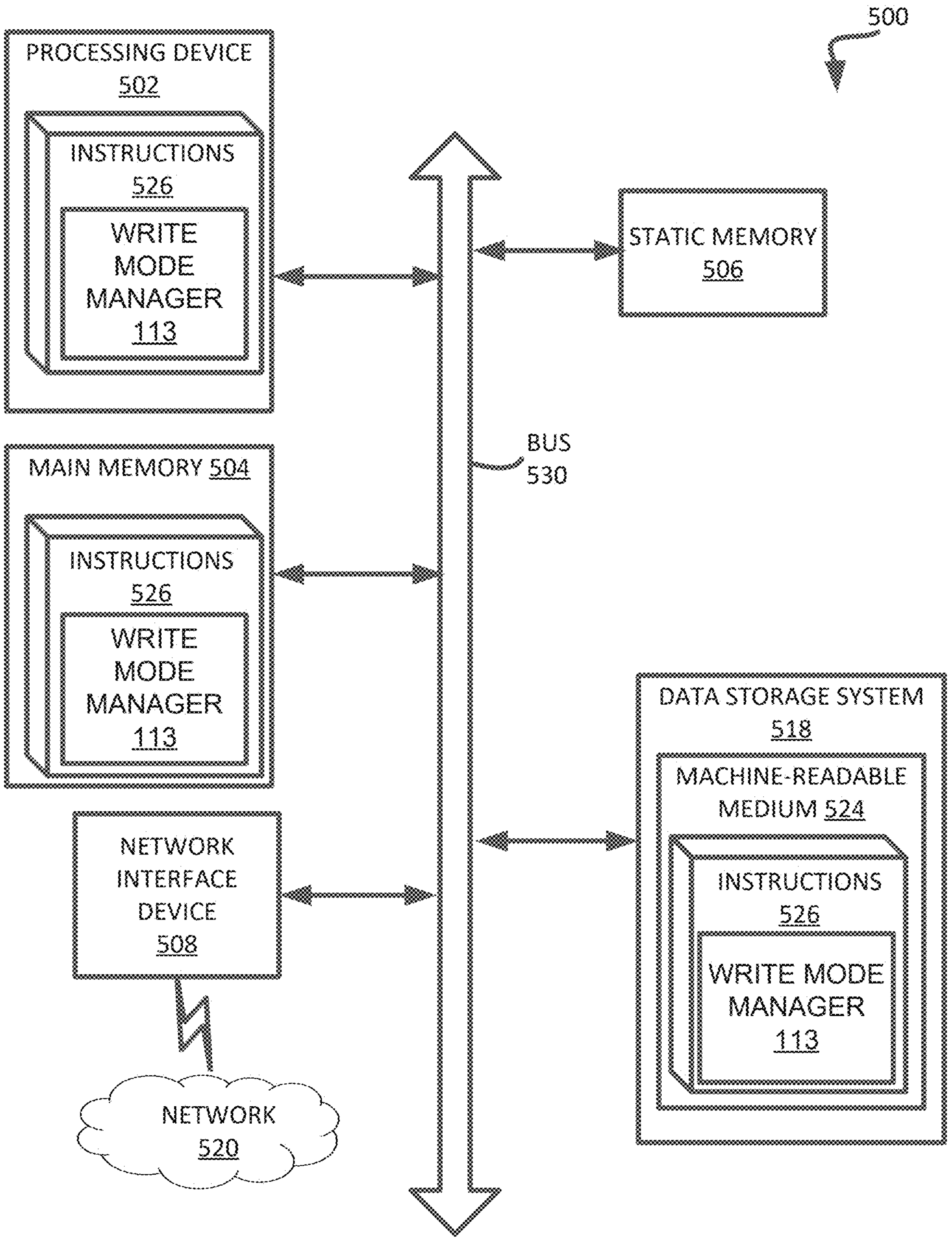
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the Write Mode Manager component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a Write Mode Manager component (e.g., the Write Mode Manager component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving a request to write data to the memory device, wherein the memory device is configured to store a first number of bits per memory cell;
obtaining a temperature measurement of the memory device;
responsive to determining that the temperature measurement of the memory device satisfies a first operating temperature threshold criterion, reconfiguring at least a portion of the memory device to store a second number of bits per memory cell, wherein the first operating temperature threshold criterion is associated with the first number of bits per memory cell, and wherein the second number of bits per memory cell is less than the first number of bits per memory cell; and
performing a write operation to store the data in the memory device using the second number of bits per memory cell.

2. The system of claim 1, wherein the processing device is configured to perform operations further comprising:
obtaining a capacity measurement of a portion of the memory device configured as a cache; and
responsive to determining that the capacity measurement of the cache of the memory device fails to satisfy a capacity threshold criterion, halting write operations, and wherein the portion of the memory device configured as the cache is configured to store the second number of bits per memory cell.

3. The system of claim 1, wherein the processing device is configured to perform operations further comprising:
responsive to determining that the temperature measurement of the memory device satisfies a second operating temperature threshold criterion, throttling write operations for the memory device to reduce a frequency of the write operations, wherein the second operating temperature threshold criterion is associated with the second number of bits per memory cell.

4. The system of claim 1, wherein the processing device is configured to perform operations further comprising:
responsive to determining that the temperature measurement of the memory device satisfies a third operating temperature threshold criterion, halting write operations, wherein the third operating temperature threshold criterion is associated with the second number of bits per memory cell.

5. The system of claim 1, wherein the processing device is configured to perform operations further comprising:
responsive to determining that the temperature measurement no longer satisfies the first operating temperature threshold criterion, wherein the memory device is configured to store the second number of bits per memory cell, reconfiguring the memory device to store the first number of bits per memory cell.

6. The system of claim 5, wherein the processing device is configured to perform operations further comprising:
performing a read operation on a written block of the memory device, the written block comprising data stored using the second number of bits per memory cell;
performing a write operation on an available block of the memory device to write the data from the written block, wherein the available block is configured to store the first number of bits per memory cell; and
performing an erase operation on the written block.

7. The system of claim 1, wherein obtaining the temperature measurement of the memory device comprises monitoring a temperature status of the memory device in one second intervals.

8. A method comprising:
receiving a request to write data to a memory device, wherein the memory device is configured to store a first number of bits per memory cell;
obtaining a temperature measurement of the memory device;
responsive to determining that the temperature measurement of the memory device satisfies a first operating temperature threshold criterion, reconfiguring at least a portion of the memory device to store a second number of bits per memory cell, wherein the first operating temperature threshold criterion is associated with the first number of bits per memory cell, and wherein the second number of bits per memory cell is less than the first number of bits per memory cell; and
performing a write operation to store the data in the memory device using the second number of bits per memory cell.

9. The method of claim 8, further comprising:
obtaining a capacity measurement of a portion of the memory device configured as a cache; and
responsive to determining that the capacity measurement of the cache of the memory device fails to satisfy a capacity threshold criterion, halting write operations, and wherein the portion of the memory device configured as the cache is configured to store the second number of bits per memory cell.

10. The method of claim 8, further comprising:
responsive to determining that the temperature measurement of the memory device satisfies a second operating temperature threshold criterion, throttling write operations for the memory device to reduce a frequency of the write operations, wherein the second operating temperature threshold criterion is associated with the second number of bits per memory cell.

11. The method of claim 8, further comprising:
responsive to determining that the temperature measurement of the memory device satisfies a third operating temperature threshold criterion, halting write operations, wherein the third operating temperature threshold criterion is associated with the second number of bits per memory cell.

12. The method of claim 8, further comprising:
responsive to determining that the temperature measurement no longer satisfies the first operating temperature threshold criterion, wherein the memory device is configured to store the second number of bits per memory cell, reconfiguring the memory device to store the first number of bits per memory cell.

13. The method of claim 12, further comprising:

performing a read operation on a written block of the memory device, the written block comprising data stored using the second number of bits per memory cell;

performing a write operation on an available block of the memory device to write the data from the written block, wherein the available block is configured to store the first number of bits per memory cell; and performing an erase operation on the written block.

14. The method of claim 8, wherein obtaining the temperature measurement of the memory device comprises monitoring a temperature status of the memory device in one second intervals.

15. A non-transitory computer-readable storage medium comprising instructions that, when executed by a processing device, cause the processing device to perform operations comprising:

receiving a request to write data to a memory device, wherein the memory device is configured to store a first number of bits per memory cell;

obtaining a temperature measurement of the memory device;

responsive to determining that the temperature measurement of the memory device satisfies a first operating temperature threshold criterion, reconfiguring at least a portion of the memory device to store a second number of bits per memory cell, wherein the first operating temperature threshold criterion is associated with the first number of bits per memory cell, and wherein the second number of bits per memory cell is less than the first number of bits per memory cell; and performing a write operation to store the data in the memory device using the second number of bits per memory cell.

16. The non-transitory computer-readable storage medium of claim 15, wherein the processing device is configured to perform operations further comprising:

obtaining a capacity measurement of a portion of the memory device configured as a cache; and responsive to determining that the capacity measurement of the cache of the memory device fails to satisfy a capacity threshold criterion, halting write operations, wherein the portion of the memory device configured as the cache is configured to store the second number of bits per memory cell.

17. The non-transitory computer-readable storage medium of claim 15, wherein the processing device is configured to perform operations further comprising:

responsive to determining that the temperature measurement of the memory device satisfies a second operating temperature threshold criterion, throttling write operations for the memory device to reduce a frequency of the write operations, wherein the second operating temperature threshold criterion is associated with the second number of bits per memory cell.

18. The non-transitory computer-readable storage medium of claim 15, wherein the processing device is configured to perform operations further comprising:

responsive to determining that the temperature measurement of the memory device satisfies a third operating temperature threshold criterion, halting write operations, wherein the third operating temperature threshold criterion is associated with the second number of bits per memory cell.

19. The non-transitory computer-readable storage medium of claim 15, wherein the processing device is configured to perform operations further comprising:

responsive to determining that the temperature measurement no longer satisfies the first operating temperature threshold criterion, wherein the memory device is configured to store the second number of bits per memory cell, reconfiguring the memory device to store the first number of bits per memory cell.

20. The non-transitory computer-readable storage medium of claim 19, wherein the processing device is configured to perform operations further comprising:

performing a read operation on a written block of the memory device, the written block comprising data stored using the second number of bits per memory cell;

performing a write operation on an available block of the memory device to write the data from the written block, wherein the available block is configured to store the first number of bits per memory cell; and performing an erase operation on the written block.

* * * * *